US009674881B2

United States Patent
Li et al.

(10) Patent No.: US 9,674,881 B2
(45) Date of Patent: Jun. 6, 2017

(54) DEVICE TO DEVICE BEACON, USER EQUIPMENT DISCOVERY, AND RESOURCE ALLOCATION

(71) Applicant: Nokia Technologies Oy, Espoo (FI)

(72) Inventors: Zexian Li, Espoo (FI); Cassio Ribeiro, Espoo (FI); Juha Sakari Korhonen, Espoo (FI); Michal Cierny, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 112 days.

(21) Appl. No.: 14/266,809

(22) Filed: Apr. 30, 2014

(65) Prior Publication Data

US 2014/0335875 A1 Nov. 13, 2014

Related U.S. Application Data

(60) Provisional application No. 61/821,097, filed on May 8, 2013.

(51) Int. Cl.
*H04W 76/02* (2009.01)
*H04W 8/00* (2009.01)

(52) U.S. Cl.
CPC ......... *H04W 76/023* (2013.01); *H04W 8/005* (2013.01)

(58) Field of Classification Search
CPC ............................ H04W 76/023; H04W 8/005
USPC ............... 455/41.1–41.2, 450–455; 370/310, 370/328–329
See application file for complete search history.

(56) References Cited

U.S. PATENT DOCUMENTS

| 7,787,437 | B2 | 8/2010 | Sakoda |
| 2011/0085529 | A1* | 4/2011 | Choi .................. H04W 76/023 370/338 |
| 2011/0211616 | A1 | 9/2011 | Taghavi Nasrabadi et al. |
| 2012/0011247 | A1 | 1/2012 | Mallik et al. |
| 2013/0150051 | A1* | 6/2013 | Van Phan ............. H04W 12/04 455/437 |
| 2013/0172036 | A1* | 7/2013 | Miklos ................. H04W 8/005 455/517 |

(Continued)

FOREIGN PATENT DOCUMENTS

WO 2013/025057 A2 2/2013

OTHER PUBLICATIONS

"Architecture Consideration for Proximity Services With Infrastructure", SA WG2 Meeting #95, S2-130122, Agenda Item: 8.4, Release: ProSe /Rel-12, Jan. 28-Feb. 1, 2013, pp. 1-4.

(Continued)

*Primary Examiner* — Michael Mapa
(74) *Attorney, Agent, or Firm* — Squire Patton Boggs (US) LLP

(57) ABSTRACT

Device discovery may be important in a variety of communication systems including, for example, wireless communication systems. Thus, certain embodiments may provide a device to device beacon design that may provide for efficient interference management and resource allocation. For example, a method may include preparing a proximity communication request including information about a device to device communication state of a discovered user equipment or resource usage of the discovered user equipment. The method may also include transmitting the proximity communication request to a base station.

16 Claims, 6 Drawing Sheets

(56) References Cited

U.S. PATENT DOCUMENTS

| | | | | |
|---|---|---|---|---|
| 2013/0272294 A1* | 10/2013 | Mildh | ............... | H04W 56/001 370/350 |
| 2013/0322413 A1* | 12/2013 | Pelletier | ............ | H04W 72/1289 370/336 |
| 2014/0056165 A1* | 2/2014 | Siomina | ............... | H04B 1/7083 370/252 |
| 2014/0219095 A1* | 8/2014 | Lim | .................... | H04W 72/085 370/235 |
| 2014/0314057 A1* | 10/2014 | Van Phan | ......... | H04W 56/0045 370/336 |
| 2015/0245394 A1* | 8/2015 | Sharma | ................ | H04W 48/16 455/434 |
| 2016/0044621 A1* | 2/2016 | Ding | ................ | H04W 56/0025 370/350 |

OTHER PUBLICATIONS

Fodor et al., "Design Aspects of Network Assisted Device-to-Device Communications", IEEE Communications Magazine, vol. 50, Issue: 3, Mar. 2012, pp. 170-177.

Partial European Search Report received for corresponding European Patent Application No. 14166951.5, dated Sep. 5, 2014, 7 pages.

"Study on LTE Device to Device Proximity Services", 3GPP TSG RAN Meeting #58, RP-122009, Agenda: 13.2, Qualcomm Incorporated, Dec. 7, 2012, 6 pages.

"3rd Generation Partnership Project; Technical Specification Group Services and System Aspects; Feasibility Study for Proximity Services (ProSe) (Release 12)", 3GPP TR 22.803, V12.0.0, Dec. 2012, pp. 1-40.

* cited by examiner

DEVICE TO DEVICE BEACON, USER EQUIPMENT DISCOVERY, AND RESOURCE ALLOCATION

BACKGROUND

Field

Device discovery may be important in a variety of communication systems including, for example, wireless communication systems. Thus, certain embodiments may provide a device to device beacon design that may provide for efficient interference management and resource allocation.

Description of the Related Art

Direct device-to-device (D2D) is an area that may, in third generation partnership project (3GPP) release 12 (Rel-12), include features such as long term evolution (LTE) D2D discovery and communication. Discovery and communication may be two independent procedures. 3GPP technical report (TR) 22.803 (which is hereby incorporated herein by reference in its entirety) defines a proximity service (ProSe)-enabled UE as "a UE that supports ProSe Discovery and/or ProSe Communication," although any user equipment configured to operate in connection with ProSe may be considered ProSe-enabled.

There may be two deployment scenarios: general (or non-public safety) and public safety specific. General scenarios for in network (NW) coverage may be applicable for both public safety and non-public safety. In NW coverage can refer to a case in which a UE can communicate with the cellular network. Furthermore, there may be an additional public safety specific scenario for out of NW coverage and/or partial NW coverage cases. Out of NW coverage can refer to a case in which a UE cannot communicate with the cellular network and partial NW coverage can refer to a case in which not all UEs involved in the same D2D communication group (the group could include two or more UEs) have direct communication with NW.

UEs can be grouped to D2D-passive and D2D-active UEs. The group of D2D-passive UEs can include UEs that are in a D2D discovery state. These UEs are just trying to discover other D2D UEs or be discovered and do not otherwise participate to any D2D communication. Some of the D2D UEs may have proceeded to a state of active D2D communication with another UE. These UEs are in D2D-active state. The D2D-active state could typically also cover UEs with durations when the D2D communication has ceased temporarily.

Resource sharing among D2D pairs with ongoing communication can be based on contention or allocation. Allocation based systems are discussed below. Resource allocation can happen under the network control or autonomously within the group of devices in D2D communication.

In case of the general scenarios with network coverage, one way of network controlled resource allocation is that UE reports the discovered UEs to network, and then the network allocates D2D resources based on the reported information.

FIG. 1 illustrates an example of D2D communication set up procedure. As shown in FIG. 1, at 0 the UE1 110 may perform a D2D discovery procedure to discover other UEs 120 connected to eNB(s)/network 130. At 1, UE1 110 can send, to the eNB(s)/network 130 a proximity communication request with discovered UEs. Then, at 2, the eNB(s)/network 130 can identify UEs that are in active state.

At 3, the eNB(s)/network 130 can identify a possible reusable resource based on the identified UEs in active state. Then, at 4, the eNB(s)/network 130 can send an identification of the allocated resource to UE1 110 in a proximity communication response. Finally, at 5, UE1 110 can start D2D communication using the allocated resource, with one or more the other UEs 120.

This method involves potentially heavy signaling overhead and increased complexity when a huge number of devices is discovered in step 0 and reported in step 1, which may also lead to other issues, such as latency in link establishment during the eNB processing. This approach does not limit the reporting to only UEs in the D2D-active state, such as UEs that are important to be taken into account for D2D resource allocation.

In case of autonomous D2D resource allocation, one UE or multiple UEs may take the role of "master" and arrange resource allocations for D2D communication to avoid interference between neighboring D2D pairs/groups. In this case, it is necessary for a UE to check with the discovered UEs about the occupied resources. If there is no information about the D2D states of the discovered UEs, the UE has to check with all the discovered UEs. However, when the UE has the information during discovery phase, the number of devices to check can be reduced significantly.

FIG. 2 illustrates a comparison in cases between checking all discovered UEs and checking selected discovered UEs. As can be seen, checking a selected subset may reduce the checking burden.

As shown in FIG. 2, if there is no way for UE1 to know the other UEs' D2D states, UE1 needs to check the resource use with all the discovered UEs, for example, UE2, UE3 and the D2D clusters #1 and #2. If cluster #1 is known not to be in the D2D-active state, there is no need for UE1 to check the resource use with cluster #1. This is just one example, and the situation may involve many more UEs in a practical case.

BRIEF DESCRIPTION OF THE DRAWINGS

For proper understanding of the invention, reference should be made to the accompanying drawings, wherein.

DETAILED DESCRIPTION

Certain embodiments may provide an efficient method for a discovering UE to know the D2D communication states of discovered UEs. Moreover, in certain embodiments, a proximity communication request includes information about the D2D communication state or resource usage of the UE. In this way, after discovery procedure the UE knows as to whether a discovered UE should be taken into account or not when resources are allocated for D2D communication.

Two alternative technical implementations are discussed, although these should not be viewed as limitations. D2D UEs with ongoing D2D communication (and also UEs with durations when the D2D communication has ceased temporarily) can, for convenience and not limitation, be referred to as "D2D-active UEs" and the D2D UE without ongoing D2D communication can, for convenience and not limitation, be referred to as "D2D-passive UEs." D2D-active UEs may have resources allocated for D2D communication, or more generally, they may be any UEs that network considers relevant for resource allocation, for instance, because they have been active recently. D2D-passive UEs may be the other UEs, for example, those that do not have allocated resources for D2D communication.

According to a first alternative, a different set of discovery sequences can be used for D2D-active UEs as compared to D2D-passive UEs.

In this implementation option, the discovery sequences can be divided into two groups. One group of sequence can be for UEs in the active state and the other group can be for UEs in the passive state. Assuming there are in total N discovery sequences, there could be M sequences for UEs in the D2D-active state and N-M sequences for UEs in the D2D-passive state. Similarly, the differentiation could also be based on the frequency or time resource of the sequence.

In this way, during discovery procedure, the UE can know immediately whether the detected UE is in a D2D-active state or D2D-passive state. Within the message of the ProSe communication request, only UEs in the D2D-active state may be reported, which can reduce the overhead considerably, for example especially when there are many D2D-passive state UEs.

Figure 3:
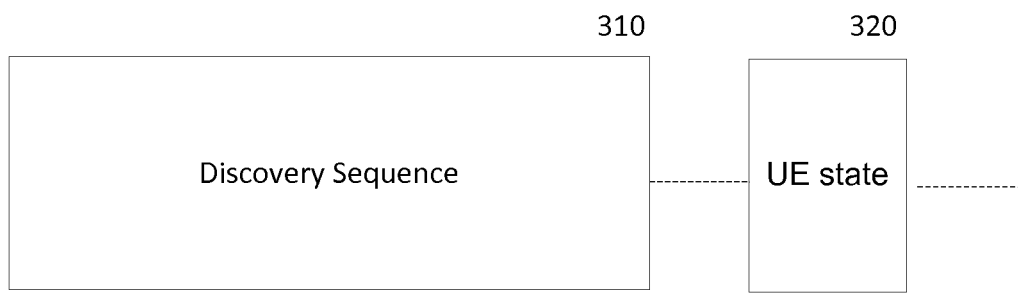
FIG. 3 illustrates a design example of a state of UE included in a discovery beacon, according to certain embodiments.

According to a second alternative, UE states can be included with or into the D2D discovery beacon. FIG. 3 illustrates a design example of a state of UE included in a discovery beacon, according to certain embodiments. As shown in FIG. 3, a base discovery sequence 310 can be accompanied by other information including UE state 320 as part of a discovery beacon.

As with the first alternative, in the second alternative the UE can immediately know the D2D state of a discovered UE. However, there is no limitation on which beacon resources can be used by the beaconing UEs. Thus, certain embodiments permit implementations where UEs are tracking other UEs' beacons without running a full search of every beaconing instance.

Figure 1:
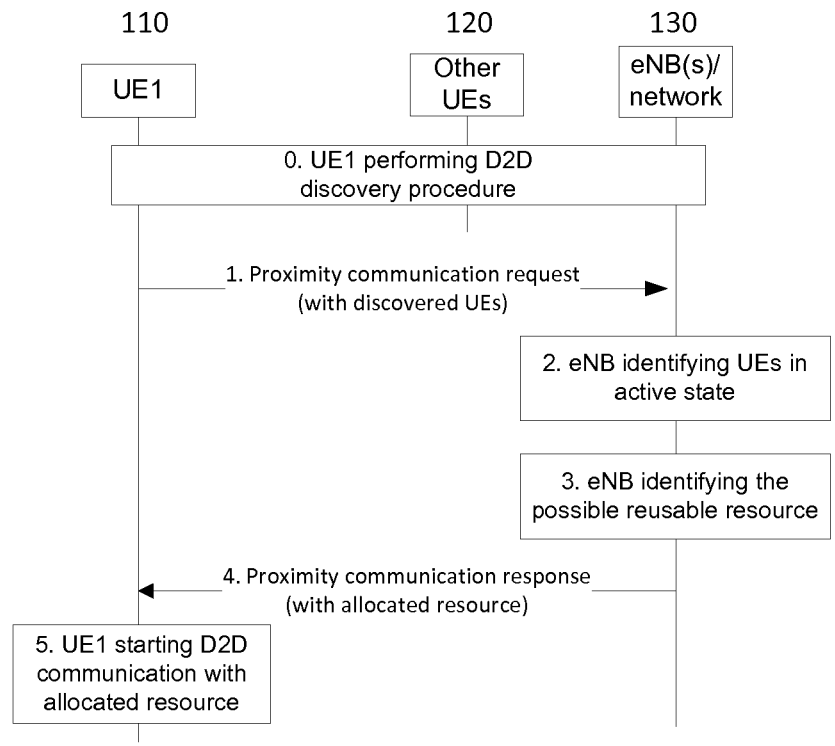
FIG. 1 illustrates an example of D2D communication set up procedure.
Figure 2:
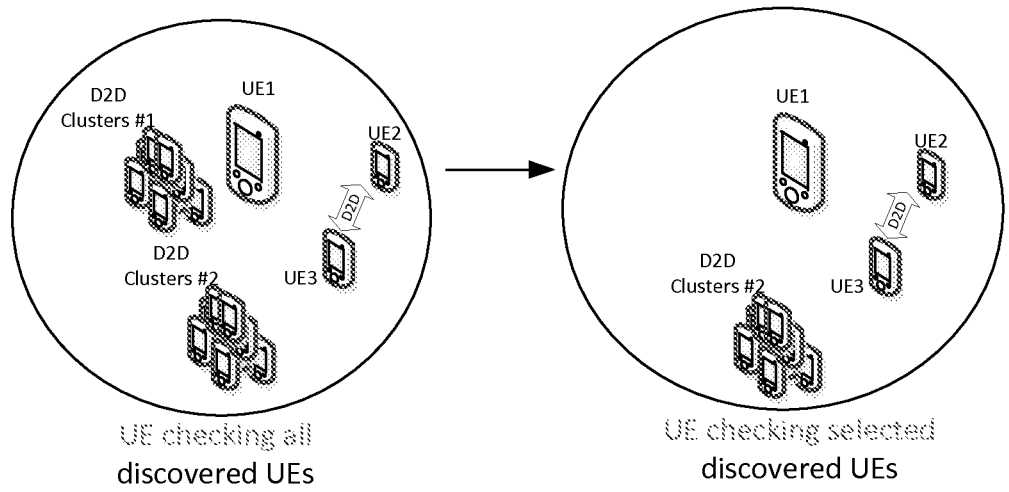
FIG. 2 illustrates a comparison in cases between checking all discovered UEs and checking selected discovered UEs.

With methods according to the above-described embodiments, the procedure for setting up ProSe D2D communication can be simplified. In contrast to FIG. 1, in FIG. 4 the number of UEs involved in proximity communication request can be reduced and step 2 can be completely removed.

Figure 4:
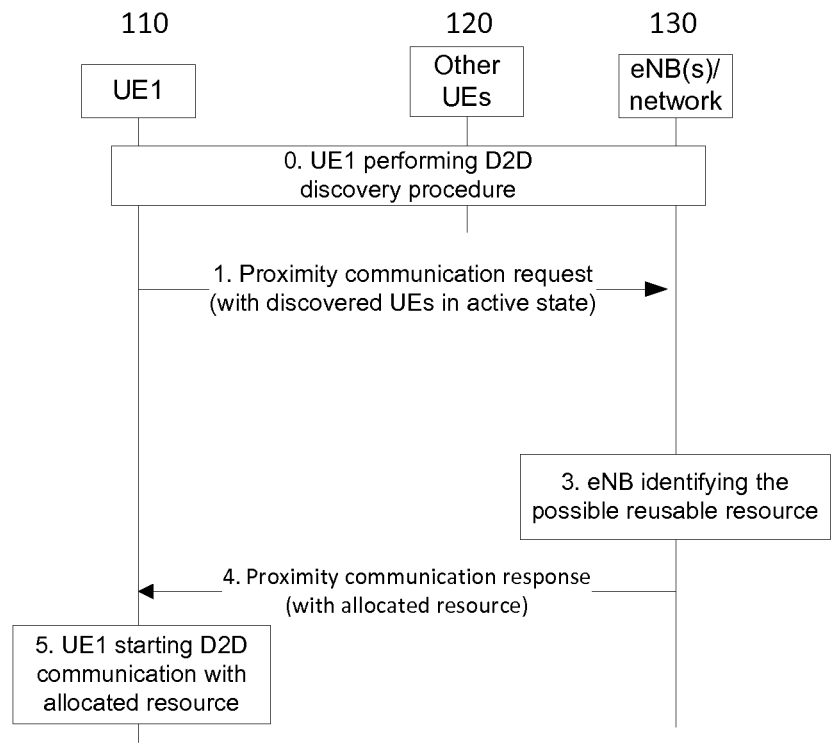
FIG. 4 illustrates a D2D communication set up procedure according to certain embodiments.

FIG. 4 illustrates a D2D communication set up procedure according to certain embodiments. As shown in FIG. 4, at 0 the UE1 110 may perform a D2D discovery procedure to discover other UEs 120 connected to eNB(s)/network 130. At 1, UE1 110 can send, to the eNB(s)/network 130 a proximity communication request with information on discovered UEs in D2D-active state. Since the communicated UEs are identified as being in a D2D-active state, it is not necessary for the eNB(s)/network 130 to perform an identification of which UEs are in a D2D-active state.

At 3, the eNB(s)/network 130 can identify a possible reusable resource. Then, at 4, the eNB(s)/network 130 can send an identification of the allocated resource to UE1 110 in a proximity communication response. Finally, at 5, UE1 110 can start D2D communication using the allocated resource, with one or more the other UEs 120.

In addition, in case of autonomous D2D operation case, it may also be beneficial to include coarse resource information in the discovery beacon. In this way, when UE discovers other UEs, it can identify the free resource based on the detected coarse resource information from discovered UEs.

In case of autonomous operation where the UEs within the cluster are acting as master or slave, and cluster master controls the resource usage within the cluster, if the UE can identify which UE is acting as cluster master, there is no need for the UE to check all the detected UEs, but only the master UE in order to get the resource usage information.

Different methods can be used for identifying the cluster master. For example, the cluster master can use dedicated resources for example dedicated sequences. Alternatively, or in addition, the cluster master can include "master/slave" information in the beacon message. In this way, when the UE detects the discovery beacon, the UE can learn the role of the detected UE and check master UE(s) only about the resource usage information. In case that no master UE but only slave UEs are detected, the UE may need to check all or some of the detected UEs. Another alternative is that in the response message from slave UE, it will include the master UE information which can be used by the discovering UE to facilitate the discovery and communication process.

D2D-active state or D2D-passive state can, in some senses, be independent of radio resource control (RRC) state, such as in case of network controlled D2D operation. In some sense, however, they can be related. Depending on the implementation in 3GPP, for example, a D2D-active UE can be in RRC_Idle state if there is no ongoing evolved packet system (EPS) service or it can be in RRC_Connected state even if there is no ongoing EPS state. Thus, D2D-active and D2D-passive are example names of D2D UE states as discussed herein. For autonomous D2D communication, there may be no mapping between D2D states and RRC states.

Various embodiments, therefore, may provide an uncomplicated method to reduce signaling overhead and complexity. Moreover, certain embodiments may also reduce coordination efforts. Furthermore, certain embodiments may reduce latency for D2D communication link establishment. Furthermore, certain embodiments can be applied to both public safety (PS) and non-PS ProSe applications, such as social applications.

Figure 5:
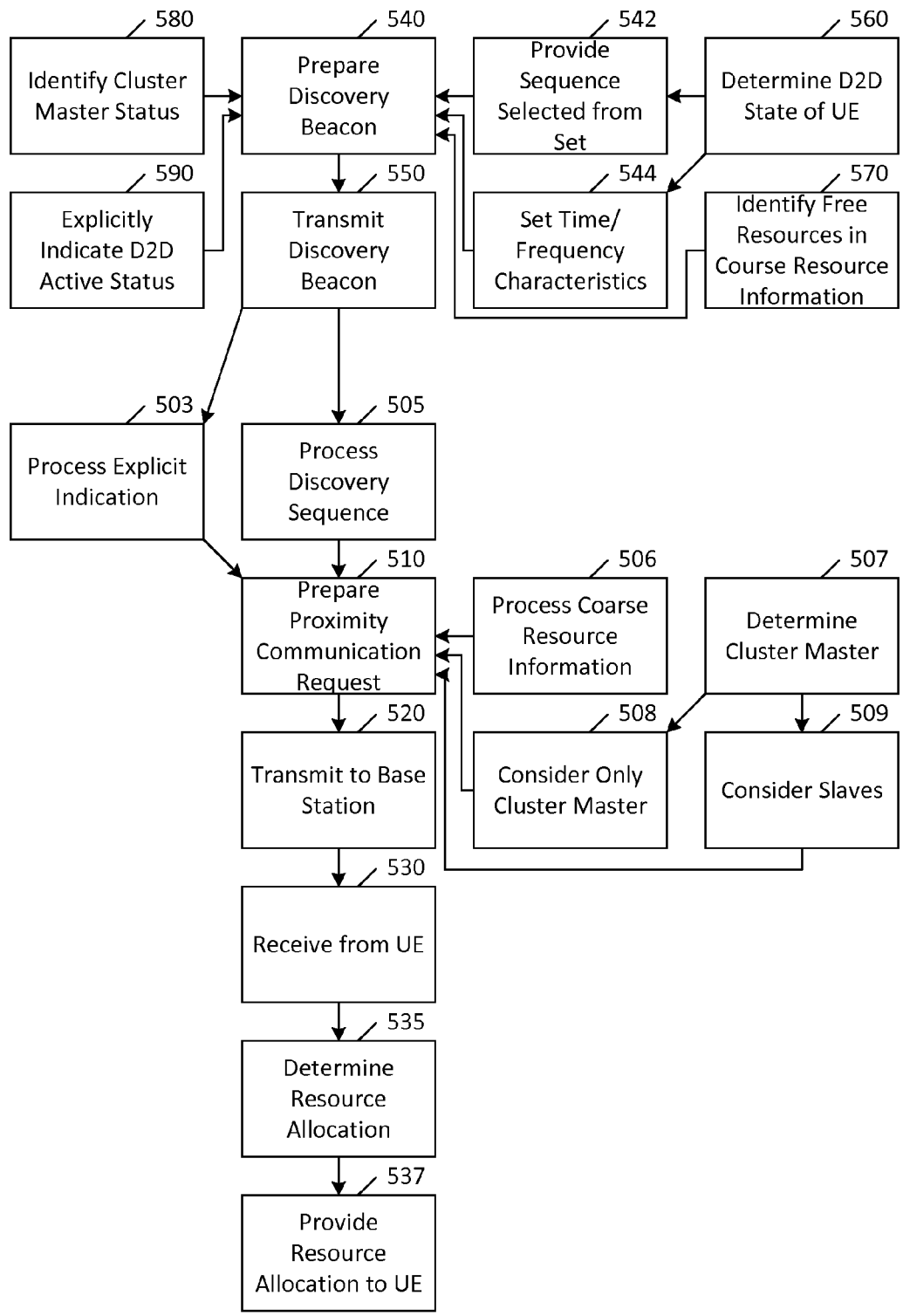
FIG. 5 illustrates a method according to certain embodiments.

FIG. 5 illustrates a method according to certain embodiments. Steps 540-590 may be performed by a user equipment, such as one of the other UEs 120 in FIG. 4. As shown in FIG. 5, the method can further include, at 540, preparing a discovery beacon. The preparing can include distinguishing the discovery beacon based on a device to device communication state of a user equipment. The device to device communication state can be, for example, either D2D-active or D2D-passive. The method can also include, at 550, transmitting the discovery beacon.

The preparing the discovery beacon can be performed in a variety of ways. For example, the method can include, at 560, determining the device to device communication state of the user equipment. Furthermore, the method can include, at 542, providing a sequence of a set of discovery sequences based on whether the user equipment is in a device to device active state or device to device passive state. Alternatively, or in addition, the method can include, at 544, setting time and/or frequency characteristics of the discovery sequence based on whether the user equipment is in a device to device active state or device to device passive state.

Furthermore, the method can include, at 570, providing an identification of free resources with coarse resource information in the discovery beacon. Moreover, the method can include, at 580, identifying, using the discovery sequence, that the user equipment is a cluster master. The identifying can include at least one of using resources dedicated to cluster masters or including master information with the discovery sequence.

Additionally, or alternatively, the method can include, at 590, explicitly indicating the device to device communication state with the discovery sequence, as shown for example in FIG. 3.

As shown in FIG. 5, a method can include, at 510, preparing a proximity communication request including information about a device to device communication state of a discovered user equipment or resource usage of the discovered user equipment or including information on only discovered D2D-active UEs. In this discussion, a discovered user equipment is mentioned to illustrate a simple example, but more than one user equipment may be discovered. The method can also include, at 520, transmitting the proximity communication request to a base station.

The method can also include, at 505, processing a received discovery sequence to determine a communication state of the discovered user equipment, such as whether the user equipment is D2D-active or D2D-passive. As mentioned above, the device to device active user equipment can be configured to provide a different set of discovery sequences from device to device passive user equipment. Alternatively, or in addition, time and/or frequency characteristics of the discovery sequence can be indicative of the device to device communication state of the discovered user equipment. Thus, the processing at 505 can take into effect these characteristics of the discovery sequences.

At 506, the method can also include processing coarse resource information in the discovery beacon and discovering free resources based on coarse resource information. The method can also include, at 508, determining whether the received discovery sequence corresponds to a cluster master. When such a cluster master is identified, the method can include, at 508, considering only the cluster master of a cluster with respect to resource usage information. The discovered user equipment can be identified as corresponding to the cluster master by at least one of the cluster master using resources dedicated to cluster masters or the cluster master including master information with the discovery sequence. When no cluster master is found, the method can include, at 509, checking slave nodes with respect to resource usage information. In the response message from slave UE, it could include the master UE information which can be further used by the discovering UE to facilitate the discovery and communication process.

In another alternative, or in addition, at 503, the method can include determining the device to device communication state based on an explicit indication with the discovery sequence. This explicit indication can be as shown in FIG. 3.

The above steps illustrated in FIG. 5 may be performed by, for example, a user equipment, such as UE1 110.

As shown in FIG. 5, at 530, a base station can receive the proximity communication request from the user equipment. Moreover, at 535, the base station can determine, based on the proximity communication request, whether one or more discovered UEs should be taken into account or not when resources are allocated for device to device communication. For example, if a UE just includes D2D-active UEs in the proximity communication request, there is no need for the base station to further determine whether the discovered UE should be considered during resource allocation or not. Rather, the determination by the base station can simply be limited to determining that the discovered UE has been included in the message from the UE. Thus, comparing FIG. 4 to FIG. 1, step 2 can effectively be eliminated.

Figure 6:
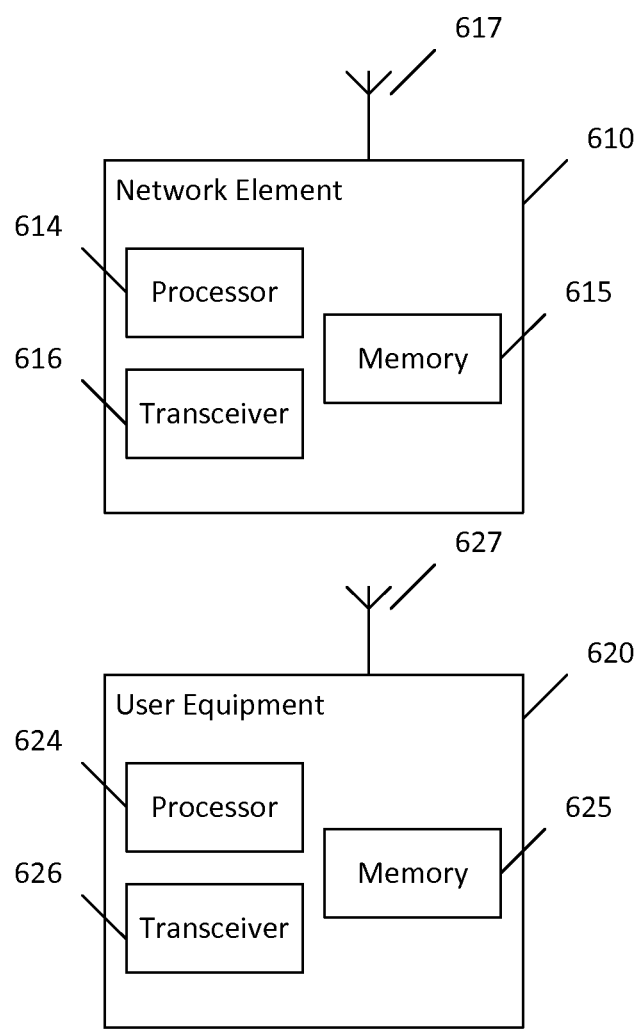
FIG. 6 illustrates a system according to certain embodiments.

As shown in FIG. 5, at 537, the method can include transmitting an indication of the allocated resources to the user equipment. This indication of allocated resources can take into account the possible reusable resources based solely on the discovered D2D-active UEs as identified in the proximity communication FIG. 6 illustrates a system according to certain embodiments of the invention. It should be understood that each block of the flowchart of FIG. 5 and any combination thereof may be implemented by various means or their combinations, such as hardware, software, firmware, one or more processors and/or circuitry. In one embodiment, a system may comprise several devices, such as, for example, network element 610 and user equipment (UE) or user device 620. The system may comprise more than one UE 620 (as shown in FIG. 4, for example) and more than one network element 610, although only one of each is shown in FIG. 6 for the purposes of illustration. A network element can be an access point, a base station, an eNode B (eNB), or any of the other network elements discussed herein. Each of these devices may comprise at least one processor or control unit or module, respectively indicated as 614 and 624. At least one memory may be provided in each device, and indicated as 615 and 625, respectively. The memory may comprise computer program instructions or computer code contained therein. One or more transceiver 616 and 626 may be provided, and each device may also comprise an antenna, respectively illustrated as 617 and 627. Although only one antenna each is shown, many antennas and multiple antenna elements may be provided to each of the devices. Other configurations of these devices, for example, may be provided. For example, network element 610 and UE 620 may be additionally configured for wired communication, in addition to wireless communication, and in such a case antennas 617 and 627 may illustrate any form of communication hardware, without being limited to merely an antenna. Likewise, some network elements 610 may be solely configured for wired communication, and such cases antenna 617 may illustrate any form of wired communication hardware, such as a network interface card.

Transceivers 616 and 626 may each, independently, be a transmitter, a receiver, or both a transmitter and a receiver, or a unit or device that may be configured both for transmission and reception. The transmitter and/or receiver may also be implemented as a remote radio head which is not located in the device itself, but in a mast, for example. It should also be appreciated that according to a liquid or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that can run on a server.

A user device or user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

Processors 614 and 624 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set, for example, procedures, functions, and the like. Memories 615 and 625 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity may be internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 610 and/or UE 620, to perform any of the processes described above (see, for example, FIGS. 4 and 5). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, or the like, or a low-level programming language, such as a machine language, or assembler. Alternatively, certain embodiments of the invention may be performed entirely in hardware.

Furthermore, although FIG. 6 illustrates a system including a network element 610 and a UE 620, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node. The UE 620 may be a cluster member, including either a cluster slave or a cluster master.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

GLOSSARY

BS Base station
D2D Device to Device
eNB Evolved Node B
ProSe Proximity service
UE User Equipment
NW Network
LTE Long Term Evolution
3GPP Third Generation Partnership Project
TR Technical Report
UE User Equipment
EPS Evolved Packet System
RRC Radio Resource Control
PS Public Safety According to a first embodiment, a method can include preparing a proximity communication request including information about a device to device communication state of at least one discovered user equipment or resource usage of the discovered user equipment. The method can also include transmitting the proximity communication request to a base station.

In a variation, information about the at least one discovered user equipment is only included in the proximity communication request if the discovered user equipment is in device to device active mode.

In a variation, the method can include receiving at least one message indicating a device to device active state or a device to device passive state of the at least one discovered user equipment.

In a variation, the method can further include processing a received discovery sequence to determine a communication state of the discovered user equipment.

In a variation, the processing to determine the communication state can include determining whether the discovered user equipment is in a device to device active state or a device to device passive state.

In a variation, device to device active user equipment can be configured to provide a different set of discovery sequences from device to device passive user equipment.

In a variation, time and/or frequency or other characteristics (for example, sequence characteristics and/or spatial domain characteristics) of the discovery sequence can be indicative of the device to device communication state of the discovered user equipment.

In a variation, method can further include processing coarse resource information in the discovery beacon and discovering free resources based on coarse resource information.

In a variation, method can further include determining whether the received discovery sequence corresponds to a cluster master.

In a variation, method can further include considering only the cluster master of a cluster with respect to resource usage information.

In a variation, the discovered user equipment can be identified as corresponding to the cluster master by at least one of the cluster master using resources dedicated to cluster masters or the cluster master including master information with the discovery sequence.

In a variation, method can further include when no cluster master is found, checking slave nodes with respect to resource usage information.

In a variation, method can further include determining the device to device communication state based on an explicit indication with the discovery sequence.

According to a second embodiment, a method can include receiving a proximity communication request from a user equipment. The method can also include determining, based on the proximity communication request, whether at least one discovered user equipment should be taken into account or not when resources are allocated for device to device communication.

In a variation, method can further include transmitting an indication of the allocated resources to the user equipment.

According to a third embodiment, a method can include preparing a discovery beacon. The preparing can include distinguishing the discovery beacon based on a device to device communication state of a user equipment. The method can also include transmitting the discovery beacon.

In a variation, method can further include determining the device to device communication state of the user equipment and providing a sequence of a set of discovery sequences based on whether the user equipment is in a device to device active state or device to device passive state.

In a variation, method can further include determining the device to device communication state of the user equipment and setting time and/or frequency characteristics of the discovery sequence based on whether the user equipment is in a device to device active state or device to device passive state.

In a variation, method can further include providing an identification of free resources with coarse resource information in the discovery beacon.

In a variation, method can further include identifying, using the discovery sequence, that the user equipment is a cluster master.

In a variation, the identifying can include at least one of using resources dedicated to cluster masters or including master information with the discovery sequence.

In a variation, method can further include explicitly indicating the device to device communication state with the discovery sequence.

According to a fourth embodiment, an apparatus can include at least one processor and at least one memory including computer program code. The at least one memory and the computer program code can be configured to, with the at least one processor, cause the apparatus at least to prepare a proximity communication request including information about a device to device communication state of at least one discovered user equipment or resource usage of the discovered user equipment. The at least one memory and the computer program code can also be configured to, with the at least one processor, cause the apparatus at least to transmit the proximity communication request to a base station.

In a variation, information about the at least one discovered user equipment is only included in the proximity communication request if the discovered user equipment is in device to device active mode.

In a variation, at least one memory and the computer program code can be configured to, with the at least one processor, cause the apparatus at least to receive at least one message indicating a device to device active state or a device to device passive state of the at least one discovered user equipment.

In a variation, the at least one memory and the computer program code can be configured to, with the at least one processor, cause the apparatus at least to process a received discovery sequence to determine a communication state of the discovered user equipment.

In a variation, the at least one memory and the computer program code can be configured to, with the at least one processor, cause the apparatus at least to determine the communication state by determining whether the discovered user equipment is in a device to device active state or a device to device passive state.

In a variation, device to device active user equipment can be configured to provide a different set of discovery sequences from device to device passive user equipment.

In a variation, time and/or frequency characteristics of the discovery sequence are indicative of the device to device communication state of the discovered user equipment.

In a variation, the at least one memory and the computer program code can be configured to, with the at least one processor, cause the apparatus at least to process coarse resource information in the discovery beacon and discovering free resources based on coarse resource information.

In a variation, the at least one memory and the computer program code can be configured to, with the at least one processor, cause the apparatus at least to determine whether the received discovery sequence corresponds to a cluster master.

In a variation, the at least one memory and the computer program code can be configured to, with the at least one processor, cause the apparatus at least to consider only the cluster master of a cluster with respect to resource usage information.

In a variation, the discovered user equipment can be identified as corresponding to the cluster master by at least one of the cluster master using resources dedicated to cluster masters or the cluster master including master information with the discovery sequence.

In a variation, the at least one memory and the computer program code can be configured to, with the at least one processor, cause the apparatus at least to, when no cluster master is found, check slave nodes with respect to resource usage information.

In a variation, the at least one memory and the computer program code can be configured to, with the at least one processor, cause the apparatus at least to determine the device to device communication state based on an explicit indication with the discovery sequence.

According to a fifth embodiment, an apparatus can include at least one processor and at least one memory including computer program code. The at least one memory and the computer program code can be configured to, with the at least one processor, cause the apparatus at least to receive a proximity communication request from a user equipment. The at least one memory and the computer program code can also be configured to, with the at least one processor, cause the apparatus at least to determine, based on the proximity communication request, whether at least one discovered user equipment should be taken into account or not when resources are allocated for device to device communication.

In variation, the at least one memory and the computer program code can be configured to, with the at least one processor, cause the apparatus at least to transmit an indication of the allocated resources to the user equipment.

According to a sixth embodiment, an apparatus can include at least one processor and at least one memory including computer program code. The at least one memory and the computer program code can be configured to, with the at least one processor, cause the apparatus at least to prepare a discovery beacon, wherein the preparation includes distinguishing the discovery beacon based on a device to device communication state of a user equipment. The at least one memory and the computer program code can also be configured to, with the at least one processor, cause the apparatus at least to transmit the discovery beacon.

In a variation, the at least one memory and the computer program code can be configured to, with the at least one processor, cause the apparatus at least to determine the device to device communication state of the user equipment and provide a sequence of a set of discovery sequences based on whether the user equipment is in a device to device active state or device to device passive state.

In a variation, the at least one memory and the computer program code can be configured to, with the at least one processor, cause the apparatus at least to determine the device to device communication state of the user equipment and set time and/or frequency characteristics of the discovery sequence based on whether the user equipment is in a device to device active state or device to device passive state.

In a variation, the at least one memory and the computer program code can be configured to, with the at least one processor, cause the apparatus at least to provide an identification of free resources with coarse resource information in the discovery beacon.

In a variation, the at least one memory and the computer program code can be configured to, with the at least one processor, cause the apparatus at least to identify, using the discovery sequence, that the user equipment is a cluster master.

In a variation, the at least one memory and the computer program code can be configured to, with the at least one processor, cause the apparatus at least to identify that the user equipment is the cluster master by at least one of using resources dedicated to cluster masters or including master information with the discovery sequence.

In a variation, the at least one memory and the computer program code can be configured to, with the at least one processor, cause the apparatus at least to explicitly indicate the device to device communication state with the discovery sequence.

According to a seventh embodiment, an apparatus can include preparing means for preparing a proximity communication request including information about a device to device communication state of at least one discovered user equipment or resource usage of the discovered user equipment. The apparatus can also include transmitting means for transmitting the proximity communication request to a base station.

In a variation, information about the at least one discovered user equipment is only included in the proximity communication request if the discovered user equipment is in device to device active mode.

In a variation, the apparatus can include receiving means for receiving at least one message indicating a device to device active state or a device to device passive state of the at least one discovered user equipment.

In a variation, the apparatus can also include processing means for processing a received discovery sequence to determine a communication state of the discovered user equipment.

In a variation, the processing to determine the communication state can include determining whether the discovered user equipment is in a device to device active state or a device to device passive state.

In a variation, device to device active user equipment can be configured to provide a different set of discovery sequences from device to device passive user equipment.

In a variation, time and/or frequency characteristics of the discovery sequence can be indicative of the device to device communication state of the discovered user equipment.

In a variation, the apparatus can also include processing means for processing coarse resource information in the discovery beacon and discovering free resources based on coarse resource information.

In a variation, the apparatus can also include determining means for determining whether the received discovery sequence corresponds to a cluster master.

In a variation, the apparatus can also include excluding means for considering only the cluster master of a cluster with respect to resource usage information.

In a variation, the discovered user equipment can be identified as corresponding to the cluster master by at least one of the cluster master using resources dedicated to cluster masters or the cluster master including master information with the discovery sequence.

In a variation, the apparatus can also include checking means for, when no cluster master is found, checking slave nodes with respect to resource usage information.

In a variation, the apparatus can also include determining means for determining the device to device communication state based on an explicit indication with the discovery sequence.

According to an eighth embodiment, an apparatus can include receiving means for receiving a proximity communication request from a user equipment. The apparatus can also include determining means for determining, based on the proximity communication request, whether at least one discovered user equipment should be taken into account or not when resources are allocated for device to device communication.

In a variation, the apparatus can also include transmitting means for transmitting an indication of the allocated resources to the user equipment.

According to a ninth embodiment, an apparatus can include preparing means for preparing a discovery beacon, wherein the preparing comprises distinguishing the discovery beacon based on a device to device communication state of a user equipment. The apparatus can also include transmitting means for transmitting the discovery beacon.

In a variation, the apparatus can also include determining means for determining the device to device communication state of the user equipment and providing means for providing a sequence of a set of discovery sequences based on whether the user equipment is in a device to device active state or device to device passive state.

In a variation, the apparatus can also include determining means for determining the device to device communication state of the user equipment and setting means for setting time and/or frequency characteristics of the discovery sequence based on whether the user equipment is in a device to device active state or device to device passive state.

In a variation, the apparatus can also include identifying means for providing an identification of free resources with coarse resource information in the discovery beacon.

In a variation, the apparatus can also include identifying means for identifying, using the discovery sequence, that the user equipment is a cluster master.

In a variation, the identifying can include at least one of using resources dedicated to cluster masters or including master information with the discovery sequence.

In a variation, the apparatus can also include indicating means for explicitly indicating the device to device communication state with the discovery sequence.

According to tenth through twelfth embodiments, respectively, a non-transitory computer readable medium can be encoded with instructions that, when executed in hardware, perform a process. The process can correspond to any of the first through third embodiments respectively, in each of their variations.

We claim:

1. An apparatus, comprising:
at least one processor; and
at least one memory including computer program instructions,
wherein the least one memory and the computer program instructions are configured to, with the at least one processor, cause the apparatus at least to
process at a user equipment a received discovery sequence to determine a device to device communication state of at least one discovered user equipment, wherein the device to device communication state comprises an active state with ongoing device to device communication or a passive state without the ongoing device to device communication;
determine whether the received discovery sequence corresponds to a cluster master, wherein when the discovery sequence of the at least one discovered user equipment corresponds to the cluster master, and wherein the apparatus receiving the discovery sequence is configured not to check for resource usage information for any other discovered user equipment;
prepare a proximity communication request including information about the device to device communication state of at least one of the discovered user equipment or the resource usage information of the discovered user equipment, wherein the device to device communication state of the at least one discovered user equipment or the resource usage information of the discovered user equipment corresponds to the cluster master; and
transmit the proximity communication request from the user equipment to a base station.

2. The apparatus of claim 1, wherein the least one memory and the computer program instructions are configured to, with the at least one processor, cause the apparatus at least to include information about the at least one discovered user equipment in the proximity communication request only when the device to device communication state of the at least one discovered user equipment is in the active state.

3. The apparatus of claim 1, wherein the least one memory and the computer program instructions are configured to, with the at least one processor, cause the apparatus at least to receive at least one message indicating the active state with the ongoing device to device communication or the passive state without the ongoing device to device communication of the at least one discovered user equipment.

4. The apparatus of claim 1, wherein the least one memory and the computer program instructions are configured to, with the at least one processor, cause the apparatus at least to determine whether the at least one discovered user equipment is in the device to device active state or the device to device passive state.

5. The apparatus of claim 1, wherein the at least one discovered user equipment in the active state are configured to provide a different set of discovery sequences from the at least one discovered user equipment in the passive state.

6. The apparatus of claim 1, wherein at least one of time, frequency, or other characteristics of the discovery sequence are indicative of the device to device communication state of the discovered user equipment.

7. The apparatus of claim 1, wherein the least one memory and the computer program instructions are configured to, with the at least one processor, cause the apparatus at least to process resource information included in a discovery beacon, and discover free resources based on the resource information.

8. The apparatus of claim 7, wherein the least one memory and the computer program instructions are configured to, with the at least one processor, cause the apparatus at least to check slave nodes with respect to resource usage information when no cluster master is found.

9. The apparatus of claim 1, wherein the at least one discovered user equipment is identified as corresponding to the cluster master by at least one of the cluster master using resources dedicated to cluster masters or the cluster master including master information with the discovery sequence.

10. An apparatus, comprising:
at least one processor; and
at least one memory including computer program instructions,
wherein the least one memory and the computer program instructions are configured to, with the at least one processor, cause the apparatus at least to
prepare a discovery beacon;
distinguish the discovery beacon based on a device to device communication state of a user equipment, wherein the device to device communication state of the user equipment comprises an active state with ongoing device to device communication or a passive state without ongoing device to device communication;
provide a sequence of a set of discovery sequences based on whether the user equipment is in the device to device active state or the device to device passive state;
identify, using the sequence, that the user equipment is a cluster master; and
transmit the discovery beacon comprising usage resource information of the identified cluster master or the device to device communication state of the user equipment to another user equipment, wherein when the sequence corresponds to the cluster master, the another user equipment receiving the discovery sequence is triggered to not check for source usage information for any other discovered user equipment.

11. The apparatus of claim 10, wherein the least one memory and the computer program instructions are configured to, with the at least one processor, cause the apparatus at least to determine the device to device communication state of the user equipment.

12. The apparatus of claim 10, wherein the least one memory and the computer program instructions are configured to, with the at least one processor, cause the apparatus at least to determine the device to device communication state of the user equipment and setting at least one of time or frequency characteristics of the discovery sequence based on whether the user equipment is in the active state or the passive state.

13. A method, comprising:
processing at a user equipment a received discovery sequence to determine a device to device communication state of at least one discovered user equipment, wherein the device to device communication state comprises an active state with ongoing device to device communication or a passive state without the ongoing device to device communication;
determining whether the received discovery sequence corresponds to a cluster master, wherein when the discovery sequence of the at least one discovered user equipment corresponds to the cluster master, the apparatus receiving the discovery sequence does not check for resource usage information for any other discovered user equipment;
preparing a proximity communication request including information about the device to device communication state of at least one of the discovered user equipment or the resource usage information of the discovered user equipment, wherein the device to device communication state of the at least one discovered user equipment or the resource usage information of the discovered user equipment corresponds to the cluster master; and transmitting the proximity communication request from the user equipment to a base station.

14. The method of claim 13, wherein information about the at least one discovered user equipment is only included in the proximity communication request when the device to device communication state of the at least one discovered user equipment is in the active state.

15. The method of claim 13, further comprising:

receiving at least one message indicating the active state with the ongoing device to device communication or the device to device passive state without the ongoing device to device communication of the at least one discovered user equipment.

16. The method of claim 13, wherein at least one of time, frequency, or other characteristics of a discovery sequence are indicative of the device to device communication state of the discovered user equipment.

\* \* \* \* \*